US009710712B2

(12) United States Patent
Madden et al.

(10) Patent No.: US 9,710,712 B2
(45) Date of Patent: Jul. 18, 2017

(54) SYSTEM AND METHOD FOR DETECTING, TRACKING, AND CLASSIFIYING OBJECTS

(71) Applicant: AVIGILON FORTRESS CORPORATION, Vancouver (CA)

(72) Inventors: Don Madden, State College, PA (US); Ethan Shayne, Sterling, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 0 days.

(21) Appl. No.: 14/736,644

(22) Filed: Jun. 11, 2015

(65) Prior Publication Data
US 2016/0210512 A1 Jul. 21, 2016

Related U.S. Application Data

(60) Provisional application No. 62/104,507, filed on Jan. 16, 2015.

(51) Int. Cl.
G06K 9/00 (2006.01)

(52) U.S. Cl.
CPC ..... *G06K 9/00771* (2013.01); *G06K 2209/23* (2013.01)

(58) Field of Classification Search
None
See application file for complete search history.

(56) References Cited

U.S. PATENT DOCUMENTS

| 6,678,413 B1* | 1/2004 | Liang | A61B 5/1113 348/169 |
| 6,954,498 B1* | 10/2005 | Lipton | G06K 9/00771 348/E5.058 |
| 2004/0232054 A1* | 11/2004 | Brown | G01V 5/0008 209/552 |
| 2005/0073585 A1* | 4/2005 | Ettinger | H04N 7/18 348/155 |
| 2005/0267657 A1* | 12/2005 | Devdhar | G06K 9/00208 701/33.4 |
| 2010/0128931 A1* | 5/2010 | Bongard | G07B 15/06 382/105 |

(Continued)

OTHER PUBLICATIONS

PhotoModeler, Apr. 2, 2013 [retrieved from the internet on Nov. 5, 2015], http://www.photomodeler.com/products/modeler/default.html.*

(Continued)

*Primary Examiner* — Matthew Bella
*Assistant Examiner* — Brian Shin
(74) *Attorney, Agent, or Firm* — MH2 Technology Law Group, LLP

(57) ABSTRACT

The present disclosure provides for a method, device, and computer-readable storage medium for performing a method for discerning a vehicle at an access control point. The method including obtaining a video sequence of the access control point; detecting an object of interest from the video sequence; tracking the object from the video sequence to obtain tracked-object data; classifying the object to obtain classified-object data; determining that the object is a vehicle based on the classified-object data; and determining that the vehicle is present in a predetermined detection zone based on the tracked-object data.

27 Claims, 7 Drawing Sheets

(56) References Cited

U.S. PATENT DOCUMENTS

2014/0218520 A1* 8/2014 Teich .................. H04N 5/2354
                                                          348/143

OTHER PUBLICATIONS

Alan J. Lipton et al., "Moving Target Classification and Tracking from Real-time Video", WACV '98 Proceedings, Oct. 1998, pp. 8-14.

Robert T. Collins et al., "A System for Video Surveillance and Monitoring", Technology Report CMU-RI-TR-00-12, Robotics Institute, May 2000, pp. 1-69.

* cited by examiner

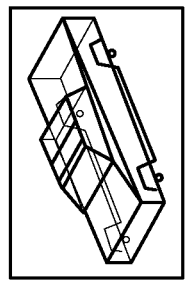
FIG. 4C  PICKUP TRUCK
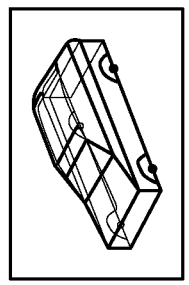
FIG. 4B  SUV
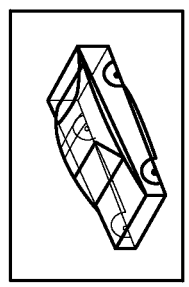
FIG. 4A  PASSENGER CAR

INITIAL POSE

ITERATION 4

ITERATION 8

ITERATION 20
L ~ 19'

SYSTEM AND METHOD FOR DETECTING, TRACKING, AND CLASSIFYING OBJECTS

CROSS-REFERENCE TO RELATED APPLICATIONS

This application claims priority to and the benefit of the U.S. Provisional Patent Application having Ser. No. 62/104,507, filed on Jan. 16, 2015, entitled "Smart Gate," to Don Madden et al., the entirety of which is incorporated by reference herein.

FIELD

One or more of the presently disclosed examples is related to image-based vehicle detection, tracking, and classification at access control points.

BACKGROUND

Image-based systems are commonly used in different businesses and industries. These systems typically include a video camera that obtains and records images within its sensory field. For example, a video camera provides a video record of whatever is within the field of view (FOV) of its lens. The obtained images may then be monitored by a human operator in real time and/or recorded and reviewed later by a human operator. Recent progress has allowed such images to be monitored also by an automated system, improving performance and saving human labor.

Accurate and reliable vehicle presence detection is an important component in an automated access control point (ACP). However, currently employed inductive loop vehicle detector systems, which detect the metal in cars and trucks that pass over a loop wire buried in the roadway, have inherent limitations, including difficulties detecting smaller vehicles and false detections from metallic gates. Furthermore, inductive loops are ill-suited for detection of exceptional conditions or scenarios, such as atypical vehicles, tailgating, or dismount activity. For example, an inductive loop can easily mistake a trailer on a vehicle for another vehicle tailgating it (or vice-versa). Thus, an improved vehicle detection system at ACPs is desirable to overcome these problems.

SUMMARY

In implementations, a method for discerning a vehicle at an access control point is provided. The method can comprise obtaining a video sequence of the access control point; detecting an object of interest from the video sequence; tracking the object from the video sequence to obtain tracked-object data; classifying the object to obtain classified-object data; determining that the object is a vehicle based on the classified-object data; and determining that the vehicle is present in a predetermined detection zone based on the tracked-object data.

In some aspects, detecting the object of interest can further comprise employing a stochastic background modeling technique or a segmentation technique to detect the object in the video sequence.

In some aspects, tracking the object can comprise employing a motion detection technique to track the object in the video sequence.

In some aspects, the detecting the object of interest can further comprise extracting background components from the video sequence.

In some aspects, tracking the object can comprise determining if a pixel in a frame of the video sequence represents an object that is moving based on a stochastic model of a background scene in the frame; and clustering pixels in the frame that represent the object that is moving.

In some aspects, tracking the object can comprise identifying a position of the object in the frame of the video sequence; identifying candidate objects in a next frame of the video sequence; and comparing the object in the frame with candidate objects in the next frame to determine a next position of the object in the next frame.

In some aspects, classifying the object can comprise comparing the object with one or more vehicle classifications to determine a type of vehicle that is similar to the tracked object using a 3-D model based fitting technique.

In some aspects, the one or more vehicle classifications can be based on computer-assisted drawings of vehicle types.

In some aspects, comparing the object can comprise comparing the object based on fitting the object to a model of a vehicle having between 10-30 vertices and between 10-40 facets to approximate a mean shape of a computer-assisted drawing of the vehicle.

In implementations, a device for discerning a vehicle at an access control point is provided. The device can comprise a memory containing instructions; and at least one processor, operably connected to the memory, the executes the instructions to perform operations comprising obtaining a video sequence of the access control point; detecting an object of interest from the video sequence; tracking the object from the video sequence to obtain tracked-object data; classifying the object to obtain classified-object data; determining that the object is a vehicle based on the classified-object data; and determining that the vehicle is present in a predetermined detection zone based on the tracked-object data.

The present disclosure also provides a computer-readable medium which stores programmable instructions configured for being executed by at least one processor for performing the methods and operations described herein according to the present disclosure. The computer-readable medium can include flash memory, CD-ROM, a hard drive, etc.

BRIEF DESCRIPTION OF THE DRAWINGS

The foregoing and other features of various embodiments will be apparent from the following, more particular description of such embodiments, as illustrated in the accompanying drawings, wherein like reference numbers generally indicate identical, functionally similar, and/or structurally similar elements.

FIGS. 4A-4C show three examples of wireframe models of a passenger car, a sports utility vehicle, and a pickup truck, respectively, that can be used to classify a vehicle, according to the present teachings;

DEFINITIONS

Figure 1:
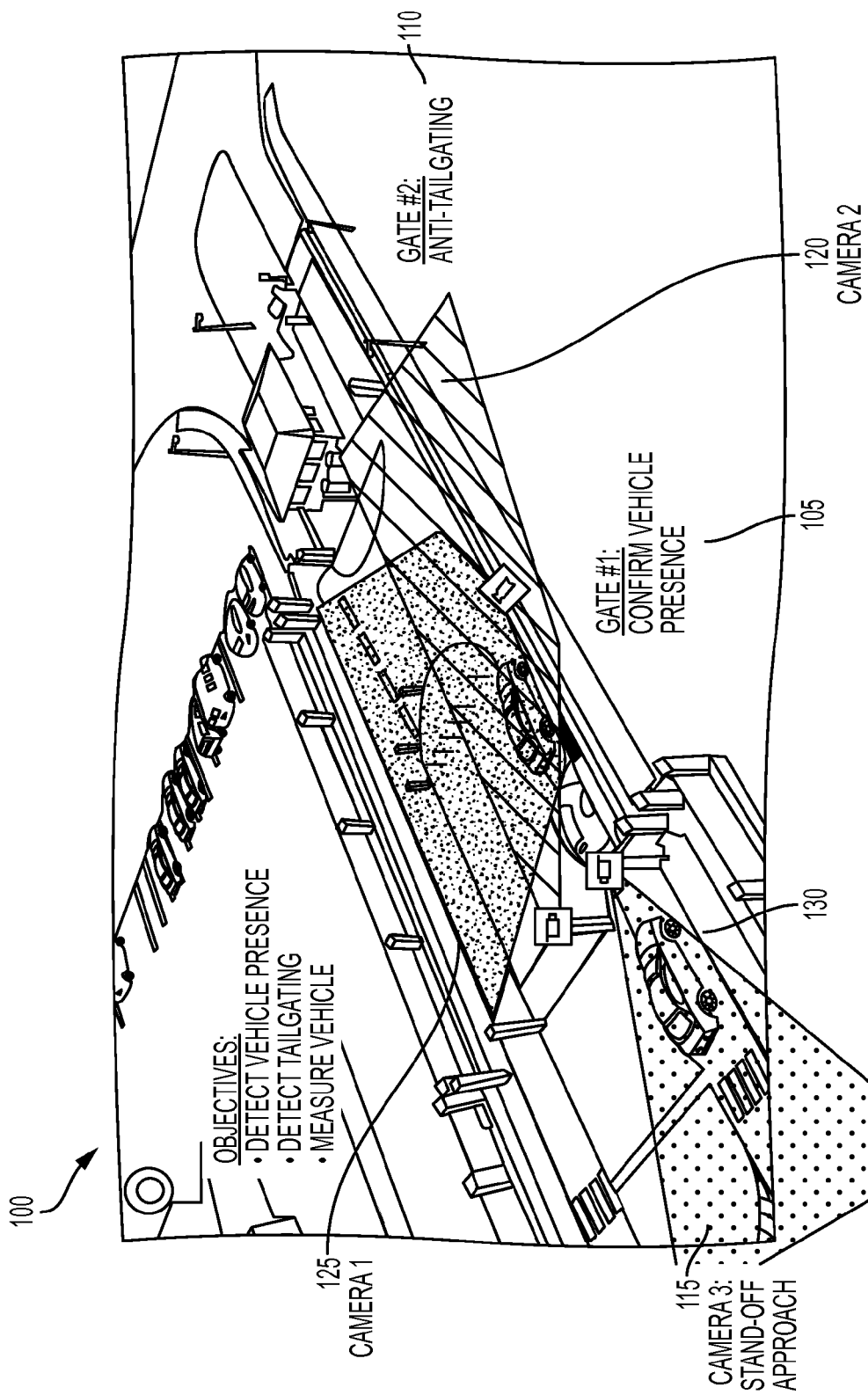
FIG. 1 shows an example of an access control point environment with illustrative placement of video analytics cameras to provide vehicle presence detection, according to the present teachings.

In describing the disclosed examples of embodiments of the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" refers to some or all of a video.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that include at least one processor and that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super minicomputer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data, which may include software, accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the described is not intended to be limited to the specific terminology so selected. A person skilled in the relevant art will recognize that other components and configurations may be used without parting from the spirit and scope of the described. It is to be understood that each specific element includes all technical equivalents that operate in a similar manner to accomplish a similar purpose. Each reference cited herein is incorporated by reference. The examples and embodiments described herein are non-limiting examples.

In general, the present teachings are directed to the automatic calibration and geo-registration of one or more video cameras by using the positional information provided by the objects in the environment and to particular directing, tracking, and classifying uses thereof. The calibration and geo-registration information may be provided in the form of parameters and geometric information of the video camera and video camera field of view. The calibration information may be used for image-based mensuration (i.e., the measurement of geometric quantities), and it may improve video understanding components, such as the target detector, the target tracker, or the target classifier by making, for example, absolute position, size, speed and heading information of the object available. The present teachings may also improve detection of video events and threats by facilitating the mensuration of, for example, actual position, speed, heading, and sizes of moving targets, and estimated time of collision/impact.

Video analytics as provided herein can be used to supplement or replace inductive loops for the purpose of vehicle presence detection at ACPs. A video analytics-based system offers at least the following benefits over current solutions: robust detection of smaller vehicles; detection of motorcycles, scooters, or even dismounts; detection of tailgating and oversize vehicles; accurate detection of tailgating vehicles, large vehicles and towed trailers; ease and flexibility of deployment where the video analytics system can leverage existing video infrastructure, requires no pavement cutting to adjust detection zones, and can be installed very quickly; and resilience to failure modes where automated detection of error conditions (e.g. obscured camera view) can alert personnel to take corrective actions.

FIG. 1 shows an example access control point environment 100 with illustrative placement of video analytics cameras to provide vehicle presence detection, according to the present teachings. As shown in FIG. 1, the example access control point environment 100 includes a first outer gate 105 that can be used to identify the presence of a vehicle 130, and a second inner gate 110 that can be used to control, if not eliminate, the possibility of one vehicle tailgating another vehicle to gain entry into the controlled environment beyond the gates. A camera 125 can be arranged near the first outer gate 105 to record vehicles approaching the first outer gate 105. Another camera 120 can be arranged to obliquely record vehicles in the area between the first outer gate 105 and the second inner gate 110 and a third camera 130 can be arranged to record vehicles approaching the second inner gate 110. Although FIG. 1 shows two gates and three cameras, the disclosure is not limited to this particular arrangement. Other configuration of gates and/or camera may also be used as will become apparent from the present disclosure.

Figure 2:
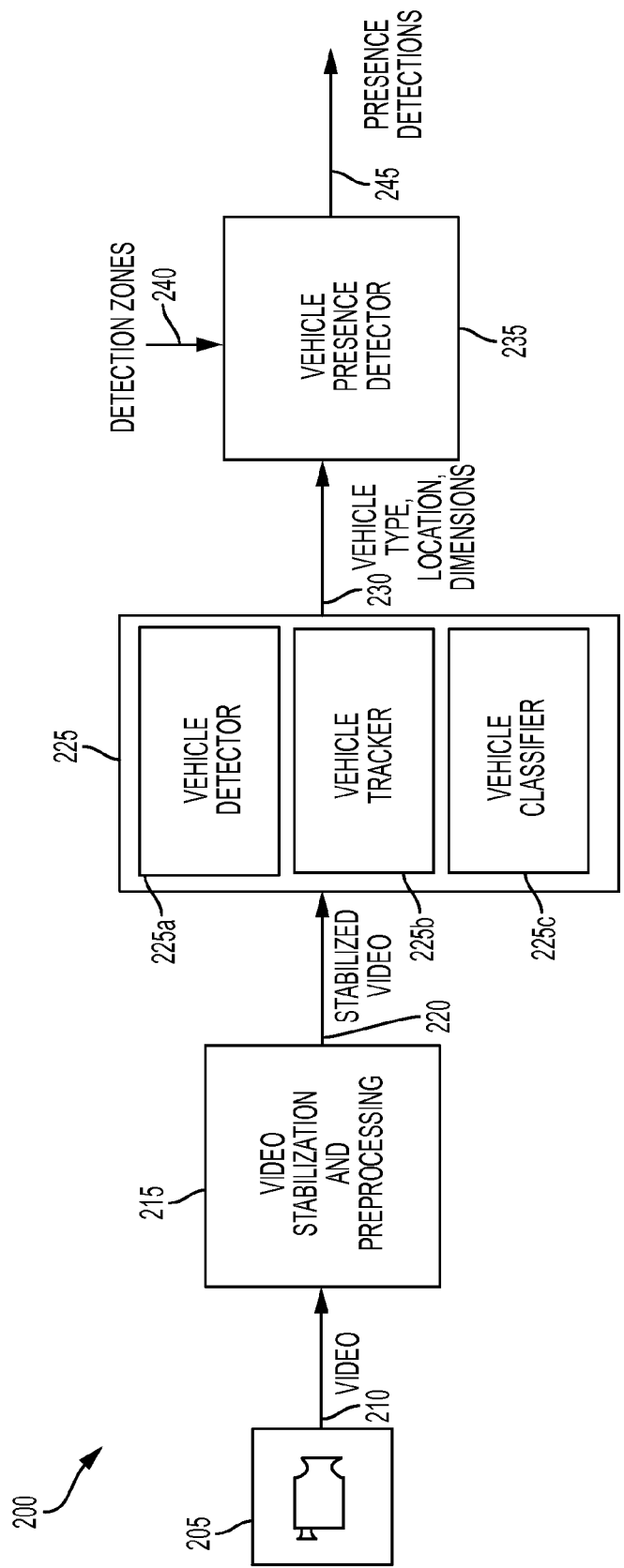
FIG. 2 illustrates an exemplary video processing system, according to the present teachings.

FIG. 2 illustrates an exemplary video processing system 200, according to the present teachings. In various embodiments, the video processing system 200 may be employed in the access control point environment 100 shown in FIG. 1. With reference to FIG. 2, in the imaging or video processing system 200, a video sequence or video sequence data 210 may be obtained from a video camera 205, such as cameras 130, 125, and/or 120, as shown in FIG. 1. Alternatively, the video sequence 210 may be prerecorded and obtained, for example, from an archive.

In some examples, the video camera 205 can be equipped with Global Positioning System (GPS) equipment and/or inertial measurement unit (IMU) to provide geo-location and orientation data associated with each video camera 205. The video sequence data 210 can include metadata that may include the GPS or IMU information, timestamp data, orientation data, field-of-view (FOV) data, etc., and the video sequence data 210 may include pixel data of the collected video images.

The video camera 205 may include optical and/or thermal imaging sensors. For example, image sensors of the video camera 205 may be embodied as an electro-optical (EO) camera with pan-tilt-zoom (PTZ) capabilities and/or a thermal or IR camera with PTZ capabilities. In one embodiment, the video cameras 205 may include commercial-off-the-Shelf (COTS) 2MP 20× PTZ EO cameras and 640×480 thermal PTZ cameras, such as the 2.0 W-H3PTZ-DP20 (2MP, 20× optical zoom camera available from AVIGILON®) and the WATCHMASTER® IP Ultra 6000 available from DRS Technologies (640×480 pan-tilt thermal camera).

For each video camera 205, in order to precisely define the location of the vehicle detection zones, the video processing system 200 can correlate each pixel in a video feed of the video camera 205 to an actual location on the ground. This geo-registration enables several operational tasks in automated video analysis systems including: (1) mapping observations from multiple sensors into a common, map-based coordinate system, (2) data fusion from multiple heterogeneous sensors, and (3) tracking across sensors with overlapping and non-overlapping fields of view.

Either automatic or manual methods for calibrating cameras can be used. The manual method can include linking, via a user interface, distinctive points in the camera imagery (such as a lane marker or curb corner) with a corresponding point(s) on a map, overhead image, or engineering drawing. The automatic method can include traversing the field-of-view with a mobile device, i.e., smartphone or the like, until the system learns the correspondence. The relationship between geodesic coordinates and image coordinates can be represented in terms of a simple 2-D homography (for planar ground surfaces) or a patch-wise series of homographies (for curved surfaces). Speed and vehicle measurements can be directly related to performance of detection and tracking. Once the vehicle is accurately tracked over several frames, the speed of the vehicle can be measured using the homographies obtained from the camera calibration information by translating the tracked motion from image coordinates into geodesic coordinates.

With multiple geo-registered cameras, tracking vehicles as they move between cameras becomes possible. Color and lighting differences between different camera views can be learned as the system observes multiple vehicles pass through the views, particularly given the linear configuration of cameras in this system. This allows the system to correlate vehicles between cameras, rather than treating them as independent entities.

Stabilized video sequence or data 220 may be obtained from a video stabilization and preprocessing unit 215. Video stabilization can be achieved using a variety of techniques, including projective global motion compensation. For example, image alignment described in U.S. Pat. No. 6,738,424, which is incorporated herein by reference in its entirety, can be used to obtain video stabilization.

Figure 3:
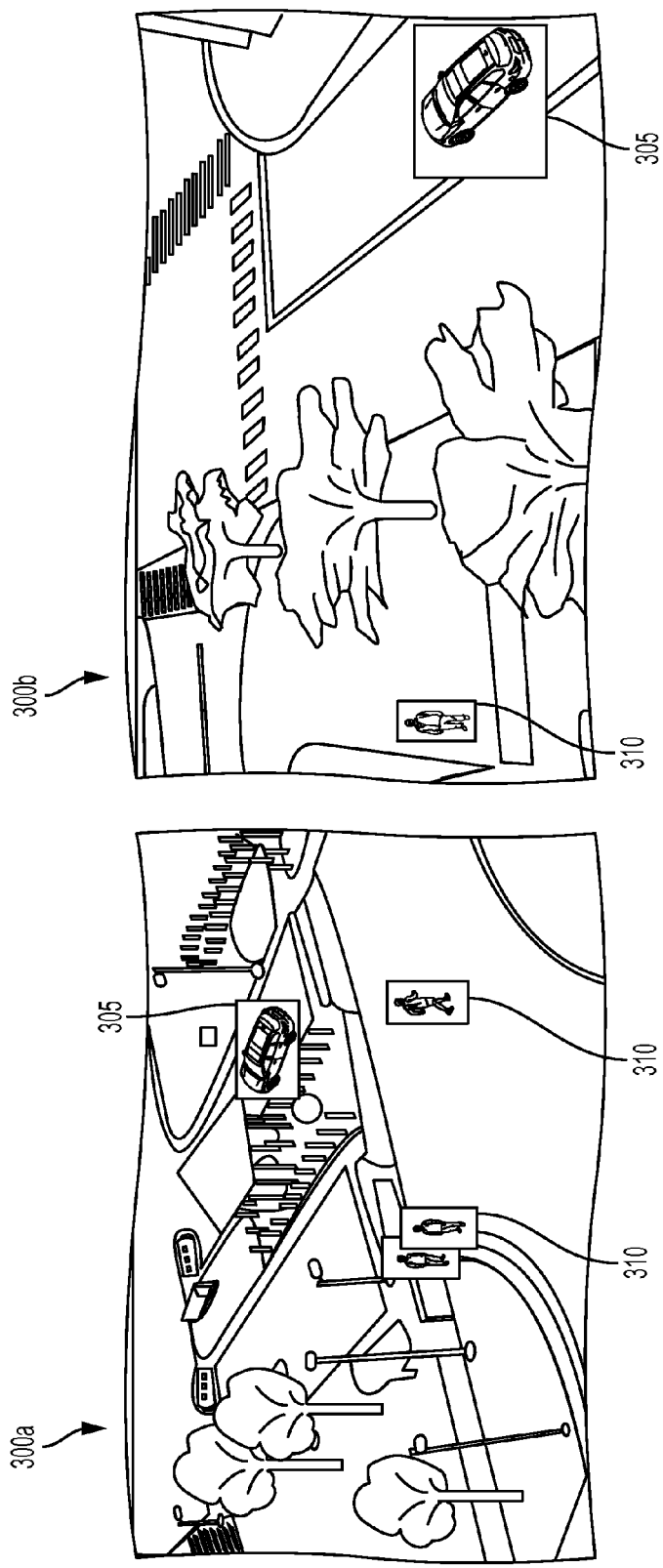
FIG. 3 shows an example of a field-of-view of one camera in 300a and a field-of-view of another camera in 300b with vehicle targets and human targets detected and tracked, according to the present teachings.
Figure 5A:
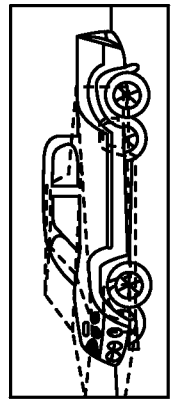
FIGS. 5A-5D shows an example of a classification of a vehicle target, where the vehicle models are iteratively fitted to the vehicle edges, according to the present teachings.
Figure 5B:
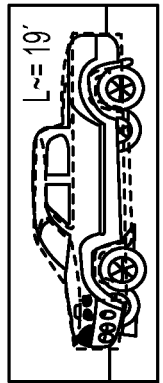
Figure 5C:
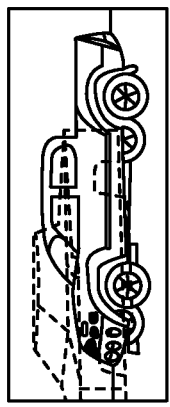
Figure 5D:
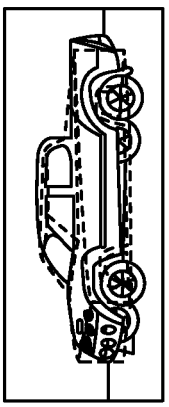

A target (e.g., object) detection module 225 may receive the stabilized video sequence 220 and use internal components to detect targets of interest 225a (e.g., a vehicle) in a field-of-view of the video camera 205, track the target 225b, and classify the target 225c. In various implementations, targets are objects that may include vehicles, people, animals, or events from the stabilized video sequence 220. Referring for a moment to FIG. 3 to provide further illustration, the frame 300a shows a field-of-view of one camera and the frame 300b shows a field-of-view of another camera. Both frames 300a and 300b depict vehicle targets 305 and human targets 310 that have been detected and tracked as indicated by the red rectangles.

Referring again to FIG. 2, in some embodiments, the target detection module 225's vehicle detector component 225a and vehicle tracker component 225b can detect and track objects using background subtraction methods based on a given scenario to detect targets in dynamic scenes using a multi-modal spatiotemporal representation of the background. A "spatiotemporal representation" may refer to the video image properties associated with the space and time together. A spatiotemporal representation has both spatial extension and temporal duration. In some implementations, any of various motion detection algorithms for detecting movement between frames at the pixel level that are known in the art can be used by the vehicle detector component 225a to detect objects such as cars and trucks. As an example, a three-frame-differencing algorithm can be used, which is discussed in A. Lipton, H. Fujiyoshi and R. S. Patil, "Moving Target Detection and Classification from Real-Time Video," Proceedings of IEEE WACV '98, Princeton, N.J., 1998, pp. 8-14, which is hereby incorporated by reference in its entirely.

In some other implementations, objects may be detected via changes, where any change detection algorithm known in the art for detecting changes from a background model can be used. In such implementations, an object can be detected if one or more pixels in a frame are deemed to be in the foreground of the frame because the pixels do not conform to a background model of the frame. As an example, a stochastic background modeling algorithm, such as dynamically adaptive background subtraction, can be used, which is described in A. Lipton, H. Fujiyoshi and R. S. Patil, "Moving Target Detection and Classification from Real-Time Video," Proceedings of IEEE WACV '98, Princeton, N.J., 1998, pp. 8-14 and U.S. Pat. No. 6,954,498 titled "Interactive Video Manipulation," both of which are incorporated by reference in their entirety.

In some instances, object tracking by the vehicle tracker 225b may be complicated in real life scenarios because of occlusions, poor visibility, and varied motion patterns. In various implementations, data association for the detected target is performed using both motion and appearance properties of targets to solve occlusions and handle detection errors and sensor noise. The objects can then be tracked by an adaptive, multi-feature, discriminative mean-shift tracker. A mean shift tracker estimates the location of a given object in a current frame by learning a histogram-based color representation of the object in previous frames and finding the location of a window in the current frame with a color distribution with maximal similarity with the learned histogram. Other tracking algorithms known in the art, such as point and global feature-based, silhouette/contour, and particle filter trackers, can be used.

In some embodiments, the tracker component 225b may track objects by employing, for example, a Kalman filter applied to the centroids of the targets, or may employ some other technique as described, for example, in U.S. Published Patent Application No. 2005/0146605, or U.S. Published Patent Application No. 2006/0268111, both of which are hereby incorporated by reference in their entireties.

In various embodiments, the tracking component 225b can output tracked-object data in the form of spatio-temporal information describing at least the location, and possibly speed, acceleration, and other motion parameters, of the object across the range of frames in which it is present within the field of view of the camera 205. Specifically, for each object being tracked, the tracking component 225b can output tracked-object data including the object's location in pixel coordinates and the corresponding frame number across the range of frames for which the object remains within the field of view of the camera 205.

In some embodiments, a priori information may be available to the vehicle classifier component 225c of the target detection module 225 to classify a set of pixels in the stabilized video sequence 220 in one of the known classes of objects, such as, for example, a person, a vehicle, a particular type of vehicle, or the like. The vehicle classifier component 225c may output classified-object data indicating how it classified the object.

The vehicle classifier component 225c may perform classification of the targets using any of a number of techniques. Various implementations may use image based classification techniques that operate by extraction of features from images and training the classifier on the feature set based on a previously identified set of images. Such image classifiers are known in the art. Examples of classifiers include linear discriminant analysis (LDA) classifiers, artificial neural networks (ANN) classifiers, support vector machines (SVM) classifiers, neural network classifiers, and Adaptive Boosting (AdaBoost) classifiers. Examples of features include Haar-like features, complex cell (C2) features, shape context features, metric size, metric velocity, trajectory, or the like. Examples of other techniques include using a linear discriminant classifier described, for example, in "A system for video surveillance and monitoring," by Collins et al., technical report CMU-RI-TR-00-12, Robotics Institute, Carnegie Mellon University, May, 2000, which is hereby incorporated by reference in its entirety.

In some embodiments, vehicles can be classified by the vehicle classifier component 225c of the target detection module 225 based on a model and/or a type of vehicle. The classification, which may be represented by classified-object data, allows identification between different types of vehicles, such as cars, trucks, sport-utility vehicles, buses, tractor trailers, motorcycles, scooters, and the like, to support proper allowance for vehicle size, (e.g., by opening a gate longer for oversized vehicles), and to recognize potential security violations, such as tailgating and entry piggybacking. Vehicle classification data can also be used to assist cross-camera tracking of vehicles and to recognize passback violations, where different vehicles use the same access card for entry. Objects, including vehicles or pedestrians, can be tracked and classified based on a number of factors including shape and appearance using, for example, a linear discriminant analysis framework.

In some embodiments, vehicles can be classified and represented in classified-object data according to a class of vehicle (motorcycle/scooter, passenger car, SUV or pickup truck, tractor trailer) using a 3-D model-based-fitting method and annotated with a color feature descriptor. The real-time vehicle fitting algorithm can use simplified 3-D models learned from detailed CAD vehicle models representing the above-mentioned vehicle classes of interest. In some implementations, each simple model can contain 16 vertices and 28 facets that best approximate the mean shape of multiple CAD models in each class, as shown in FIGS. 4A-4C. This process produces an accurate and reliable length and height estimate for over/under-sized vehicles which can be used to improve gate or barrier operations.

FIGS. 4A-4C show three examples of wireframe models of a passenger car, a sports utility vehicle, and a pickup truck, respectively, that can be used by the vehicle classifier component 225c to classify a vehicle from the set of pixels extracted from the stabilized video sequence 210. Once the set of pixels are extracted, the closest wireframe model is selected and is iteratively fitted to align the set of pixels with the model, as shown in FIGS. 5A-5D, which shows an initial pose approximation, after four iterations, after 8 iterations where the model is roughly aligned, and after 20 iterations where the pose and shape are most completely aligned, respectively.

To classify a target, the vehicle models are iteratively fitted to the vehicle edges, as shown in FIGS. 5A-5D. The initial vehicle dimensions, location, and orientation are estimated by back-projecting the detected target onto the road according to the camera calibration. The models and fitting algorithms can also be used for wheel detections, partial observations (due to view limitations and occlusions), and multiple-vehicle hypothesis (to properly discriminate closely following vehicles and trailers by correctly fitting the model to each vehicle in the group. For example, a sedan closely following a pickup truck could be mistaken for a towed trailer or part of a longer vehicle—the system could correctly differentiate this by fitting the appropriate model to each vehicle.).

Figure 6:
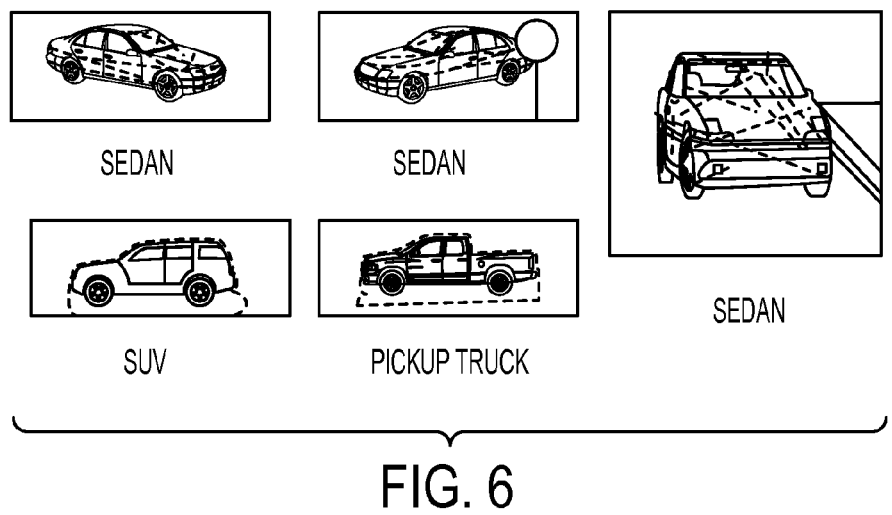
FIG. 6 shows an example of vehicle fitting and classification results, according to the present teachings.

FIG. 6 shows how the models above have been correctly fitted to the vehicles in the source video to provide classification information about each vehicle.

The output of the target detection module 225 can be target meta information 230 that may include tracked-object data produced by the vehicle tracker component 225b and classified-object data produced by the vehicle classifier component 225c. The target meta information 230 may include, for example, the target's dimensions (e.g., width, height, and/or size) within the image, location within the image, motion within the image, color, shape, class type, and the like.

As shown in the example of FIG. 2, a vehicle presence detector 235 may obtain target meta information 230 (e.g., vehicle type, location, and dimensions data) from target detection module 225 and determine whether the target is in one or more detection zones 240 to yield presence detections data 245. The detection zones are the pre-defined areas where vehicle presence is being detected and will typically correspond to the placement of the conventional inductive loops, and the system will output a binary presence detection signal for each zone. The vehicle presence detector 235 may output presence detections data 245, for example, in the form of a separate detection signal for each detection zone calculated, for example, by a background detection method, as described, for instance, in U.S. Pat. No. 6,999,600, which is hereby incorporated by reference in its entirety. The presence detections data 245 (e.g., a signal associated with a specific detection zone in front of a gate or barrier) may be used to control the movement or actuation of a movable gate or other movable barrier that controls access to an area beyond the gate or barrier.

In various implementations, the presence detections data 245 can be stored on a computer-readable medium, displayed on a computer system, or forwarded to another computer system. As the system operates, information regarding event occurrences is collected, and the information can be viewed by the operator at any time, including real time. Examples of formats for the presence detections data 245 include: data displayable on a monitor of a computer system; a hard copy of the data; data stored on a computer-readable medium; control data or signals for controlling an electro-mechanical device; and data displayable on an interactive web page.

In various implementations, the outputted presence detections data 245 can be displayed from the direct feed of the source video 210 transmitted either via analog video transmission means or via network video streaming. For example, the source video 210 can be displayed on a window of the monitor of a computer system or on a closed-circuit monitor. Further, the output 245 can include source video marked up with graphics to highlight the objects and/or areas involved in the event occurrence, for example as illustrated in FIG. 3 by the red rectangle mark ups. If the system is operating in forensic analysis mode, the video 210 may come from the video recorder.

The output 245 can include one or more reports for an operator based on the requirements of the operator and/or the event occurrences. Examples of data in a report include: the number of event occurrences which occurred; the positions in the scene in which the event occurrence occurred; the times at which the event occurrences occurred, representative imagery of each event occurrence; representative video of each event occurrence; raw statistical data; statistics of event occurrences (e.g., how many, how often, where, and when); and/or human-readable graphical displays.

The foregoing description of FIGS. 1-6 is illustrative, and variations in configuration and implementation can occur to persons skilled in the art. For instance, the various illustrative logics, logical blocks, modules, components and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions and operations described can be implemented in hardware, software, firmware, or any combination thereof. For a software implementation, the techniques described herein can be implemented with modules (e.g., procedures, functions, subprograms, programs, routines, subroutines, components, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
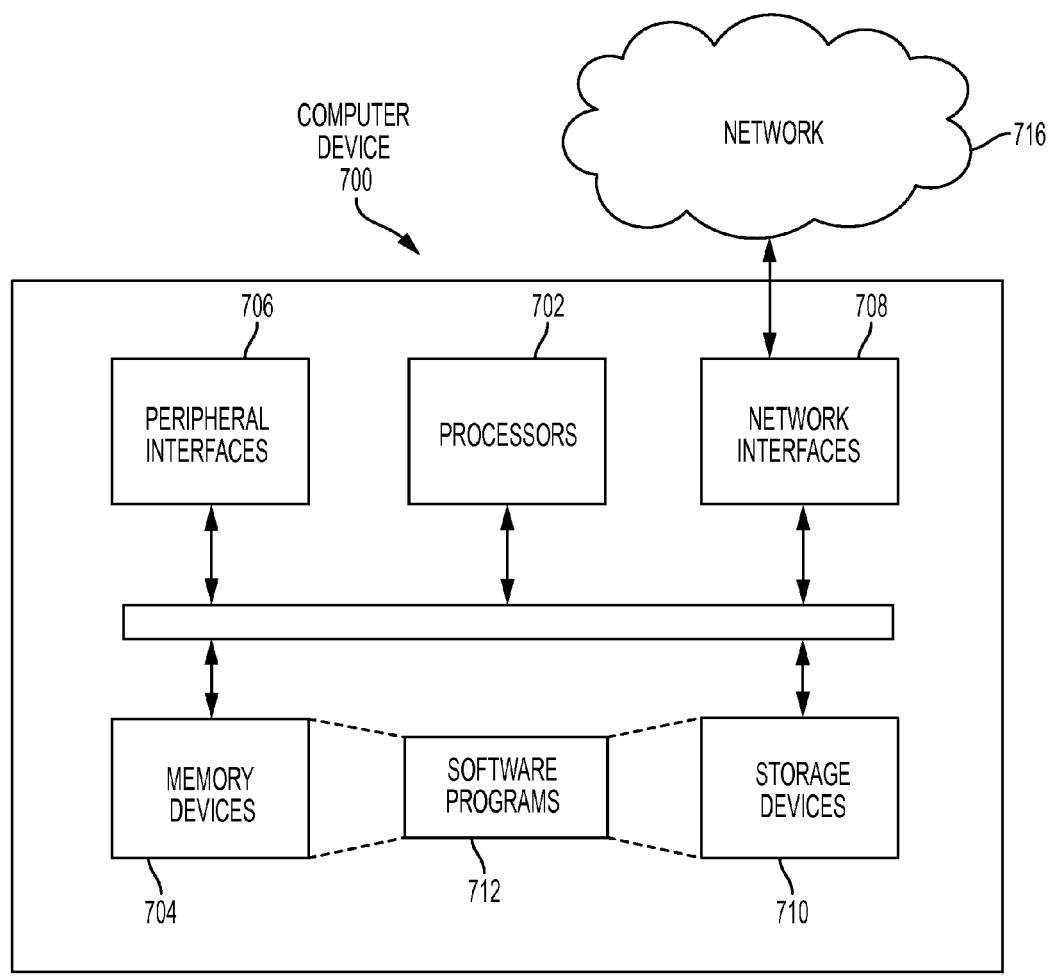
FIG. 7 illustrates an example of a computing device that may be used to implement the present teachings, in accordance with examples of the present disclosure.

For example, FIG. 7 illustrates an example of a hardware configuration for a computer device 700 that can be used to perform one or more of the processes, functions, or operations described above. While FIG. 7 illustrates various components contained in the computer device 700, FIG. 7 illustrates but one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, etc. As illustrated in FIG. 7, the computer device 700 can include one or more processors 702 of various core configurations and clock frequencies. The computer device 700 can also include one or more memory devices 704 that may be non-transitory and that may serve as a main memory during the operation of the computer device 700. For example, during operation, a copy of the software (e.g., 712) that implements the above-described features, operations, functions, or methods can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks 716, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702. The storage device 710 may include a non-transitory storage medium.

Additionally, the computer device 700 can include one or more software programs 712 that enable the functionality of the features described herein. The one or more software programs 712 can include instructions that cause the one or more processors 702 to perform the processes, functions, and operations described herein. Copies of the one or more software programs 712 can be stored in the one or more memory devices 704 and/or on in the one or more storage devices 710. Likewise, the data utilized by one or more software programs 712 can be stored in the one or more memory devices 704 and/or on in the one or more storage devices 710.

In various implementations, the computer device 700 can communicate via a network 716. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like.

The computer device 700 can include a variety of data stores and other memory and storage media as discussed above. These can reside in a variety of locations, such as on a storage medium local to (and/or resident in) one or more of the computers (e.g., 704, 710) or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the processes, methods, functions, and operations described herein can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for discerning a vehicle at an access control point, the method comprising:
obtaining a video sequence of the access control point from a first camera operable to capture video of the vehicle approaching a first outer gate;
detecting an object of interest from the video sequence;
tracking the object from the video sequence to obtain tracked-object data;
classifying the object to obtain classified-object data;

determining that the object is the vehicle based on the classified-object data;
  determining if the vehicle is being tailgated based on the classified-object data;
  determining that the vehicle is present in a predetermined detection zone of the access control point based on the tracked-object data; and
  controlling activation of the first outer gate and a second inner gate at the access control point based on the determining if the vehicle is being tailgated.

2. The method of claim 1, wherein detecting the object of interest further comprises:
  employing a stochastic background modeling technique or a segmentation technique to detect the object in the video sequence.

3. The method of claim 1, wherein tracking the object comprises:
  employing a motion detection technique to track the object in the video sequence.

4. The method of claim 1, wherein the detecting the object of interest further comprises:
  extracting background components from the video sequence.

5. The method of claim 1, wherein tracking the object comprises:
  determining if a pixel in a frame of the video sequence represents an object that is moving based on a stochastic model of a background scene in the frame; and
  clustering pixels in the frame that represent the object that is moving.

6. The method of claim 5, wherein tracking the object comprises:
  identifying a position of the object in the frame of the video sequence;
  identifying candidate objects in a next frame of the video sequence; and
  comparing the object in the frame with candidate objects in the next frame to determine a next position of the object in the next frame.

7. The method of claim 1, wherein classifying the object comprises:
  comparing the object with one or more vehicle classifications to determine a type of vehicle that is similar to the tracked object using a 3-D model based fitting technique.

8. The method of claim 7, wherein the one or more vehicle classifications are based on computer-assisted drawings of vehicle types.

9. The method of claim 7, wherein comparing the object comprises:
  comparing the object based on fitting the object to a model of a vehicle having between 10-30 vertices and between 10-40 facets to approximate a mean shape of a computer-assisted drawing of the vehicle.

10. A device for discerning a vehicle at an access control point, the device comprising:
  a memory containing instructions; and
  at least one processor, operably connected to the memory, that executes the instructions to perform operations comprising:
    obtaining a video sequence of the access control point from a first camera operable to capture video of the vehicle approaching a first outer gate;
    detecting an object of interest from the video sequence;
    tracking the object from the video sequence to obtain tracked-object data;
    classifying the object to obtain classified-object data;
    determining that the object is the vehicle based on the classified-object data;
    determining if the vehicle is being tailgated based on the classified-object data;
    determining that the vehicle is present in a predetermined detection zone of the access control point based on the tracked-object data; and
    controlling activation of the first outer gate and a second inner gate at the access control point based on the determining if the vehicle is being tailgated.

11. The device of claim 10, wherein detecting the object of interest further comprises:
  employing a stochastic background modeling technique or a segmentation technique to detect the object in the video sequence.

12. The device of claim 10, wherein tracking the object comprises:
  employing a motion detection technique to track the object in the video sequence.

13. The device of claim 10, wherein the detecting the object of interest further comprises:
  extracting background components from the video sequence.

14. The device of claim 10, wherein tracking the object comprises:
  determining if a pixel in a frame of the video sequence represents an object that is moving based on a stochastic model of a background scene in the frame; and
  clustering pixels in the frame that represent the object that is moving.

15. The device of claim 14, wherein tracking the object comprises:
  identifying a position of the object in the frame of the video sequence;
  identifying candidate objects in a next frame of the video sequence; and
  comparing the object in the frame with candidate objects in the next frame to determine a next position of the object in the next frame.

16. The device of claim 10, wherein classifying the object comprises:
  comparing the object with one or more vehicle classifications to determine a type of vehicle that is similar to the tracked object using a 3-D model based fitting technique.

17. The device of claim 16, wherein the one or more vehicle classifications are based on computer-assisted drawings of vehicle types.

18. The device of claim 16, wherein comparing the object comprises:
  comparing the object based on fitting the object to a model of a vehicle having between 10-30 vertices and between 10-40 facets to approximate a mean shape of a computer-assisted drawing of the vehicle.

19. A non-transitory computer readable storage medium comprising instructions for causing one or more processors to perform a method for discerning a vehicle at an access control point, the method comprising:
  obtaining a video sequence of the access control point from a first camera operable to capture video of the vehicle approaching a first outer gate;
  detecting an object of interest from the video sequence;
  tracking the object from the video sequence to obtain tracked-object data;
  classifying the object to obtain classified-object data;
  determining that the object is the vehicle based on the classified-object data;

determining if the vehicle is being tailgated based on the classified-object data;

determining that the vehicle is present in a predetermined detection zone of the access control point based on the tracked-object data; and controlling activation of the first outer gate and a second inner gate at the access control point based on the determining if the vehicle is being tailgated.

20. The computer readable storage medium of claim 19, wherein detecting the object of interest further comprises:

employing a stochastic background modeling technique or a segmentation technique to detect the object in the video sequence.

21. The computer readable storage medium of claim 19, wherein tracking the object comprises:

employing a motion detection technique to track the object in the video sequence.

22. The computer readable storage medium of claim 19, wherein the detecting the object of interest further comprises:

extracting background components from the video sequence.

23. The computer readable storage medium of claim 19, wherein tracking the object comprises:

determining if a pixel in a frame of the video sequence represents an object that is moving based on a stochastic model of a background scene in the frame; and clustering pixels in the frame that represent the object that is moving.

24. The computer readable storage medium of claim 19, wherein tracking the object comprises:

identifying a position of the object in the frame of the video sequence;

identifying candidate objects in a next frame of the video sequence; and comparing the object in the frame with candidate objects in the next frame to determine a next position of the object in the next frame.

25. The computer readable storage medium of claim 19, wherein classifying the object comprises:

comparing the object with one or more vehicle classifications to determine a type of vehicle that is similar to the tracked object using a 3-D model based fitting technique.

26. The computer readable storage medium of claim 25, wherein the one or more vehicle classifications are based on computer-assisted drawings of vehicle types.

27. The computer readable storage medium of claim 25, wherein comparing the object comprises:

comparing the object based on fitting the object to a model of a vehicle having between 10-30 vertices and between 10-40 facets to approximate a mean shape of a computer-assisted drawing of the vehicle.

* * * * *